(12) United States Patent
Zhao et al.

(10) Patent No.: US 9,083,245 B2
(45) Date of Patent: Jul. 14, 2015

(54) SWITCHING POWER SUPPLY WITH OPTIMIZED THD AND CONTROL METHOD THEREOF

(75) Inventors: Qiming Zhao, Shanghai (CN); Fei Xiong, Shanghai (CN); Jianyu Xie, Shanghai (CN); Xue Jiang, Shanghai (CN); Yimin Liang, Shanghai (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 378 days.

(21) Appl. No.: 13/586,096

(22) Filed: Aug. 15, 2012

(65) Prior Publication Data

US 2013/0044521 A1    Feb. 21, 2013

(30) Foreign Application Priority Data

Aug. 15, 2011   (CN) .......................... 2011 1 0232353

(51) Int. Cl.
    *H02M 3/335*    (2006.01)
    *H02M 1/42*    (2007.01)
    *H05B 33/08*    (2006.01)

(52) U.S. Cl.
CPC .............. *H02M 3/335* (2013.01); *H02M 1/425* (2013.01); *H05B 33/0815* (2013.01); *Y02B 70/126* (2013.01)

(58) Field of Classification Search
CPC ............ H02M 3/335; H02M 3/33515; H02M 2001/0012; H02M 2001/0022
USPC ...................... 363/21.13, 21.16, 21.18, 78, 79
See application file for complete search history.

(56) References Cited

U.S. PATENT DOCUMENTS

| | | | |
|---|---|---|---|
| 2005/0269999 A1* | 12/2005 | Liu et al. ........................ | 323/222 |
| 2010/0301821 A1* | 12/2010 | Kung et al. .................... | 323/283 |
| 2011/0199793 A1 | 8/2011 | Kuang et al. | |

* cited by examiner

*Primary Examiner* — Harry Behm
*Assistant Examiner* — Matthew Grubb
(74) *Attorney, Agent, or Firm* — Perkins Coie LLP

(57) ABSTRACT

A switching power supply comprising a switching circuit and a controller. The controller comprises a preprocessing circuit, a first multiplier, a first comparing circuit and a logic circuit. The controller comprises a preprocessing circuit, a first multiplier, a first comparing circuit and a logic circuit. The preprocessing circuit generates a first multiplication input signal based on the input voltage and output voltage of the switching circuit. The first multiplier multiplies the first multiplication input signal by a second multiplication input signal and generates a first product signal. The first comparing circuit compares a current sensing signal representative of the input current with the first product signal and generates a first comparison signal. The logic circuit turns off a main switch in the switching circuit when the current sensing signal is larger than the first product signal.

17 Claims, 7 Drawing Sheets

SWITCHING POWER SUPPLY WITH OPTIMIZED THD AND CONTROL METHOD THEREOF

CROSS-REFERENCE TO RELATED APPLICATION(S)

This application claims the benefit of CN application 201110232353.0, filed on Aug. 15, 2011, and incorporated herein by reference.

TECHNICAL FIELD

Embodiments of the present invention generally relate to electronic circuits, and more particularly but not exclusively to switching power supplies with optimized total harmonic distortion (THD) and control methods thereof.

BACKGROUND

Switching power supplies are widely used in electronic devices. Generally, in a switching power supply, an AC voltage is derived from the power network and rectified into an unregulated DC voltage by a rectifier bridge. The unregulated DC voltage is then converted into the signal as needed by a switching circuit.

However, along with the wide application of the switching power supplies, more and more harmonic current are injected into the power network. The injected harmonic current increases the energy loss and reduces the power factor of the system. It reduces not only the quality but also the reliability of the power network. It may even burn out the protection circuit and other apparatus. As a result, the harmonic component of the switching power supplies should be reduced and the power factor should be improved.

A prior power factor correction (PFC) method is getting the peak input current of the switching circuit to follow the input voltage of the switching circuit. To reduce the electromagnetic interference (EMI), an EMI filter is often coupled between the power network and the rectifier bridge. So the average input current of the switching circuit is equal to the current derived from the power network, which is the input current of the switching power supply. For switching circuits with continuous input current (such as Boost converters), the input current of the switching power supply will be sine wave and in phase with the AC voltage. The power factor is high and the harmonic component is small. However, for switching circuits with discontinuous input current (such as Buck, Buck-Boost or Flyback converters), the situation is totally different.

FIGS. 1 and 2 are waveforms of prior switching circuits with discontinuous input current, wherein Iin is the input current of the switching circuit, Ipk is the peak input current, CTRL is the control signal of the switching circuit, Iave is the average input current. As shown in the figures, when the peak input current Ipk is regulated to be sine wave, the average input current Iave is not sinusoidal. Thus the total harmonic distortion (THD) of the switching power supply is high and the power factor is limited.

SUMMARY

Embodiments of the present invention are directed to a switching power supply comprising a switching circuit, a current sensing circuit and a controller. The switching circuit has a main switch and a tank element, wherein the switching circuit converts an input voltage into an output voltage through the ON and OFF switching of the main switch. The current sensing circuit is coupled to the switching circuit, wherein the current sensing circuit senses the input current of the switching circuit and generates a current sensing signal representative of the input current. The controller comprises a preprocessing circuit, a first multiplier, a first comparing circuit and a logic circuit.

The preprocessing circuit is coupled to the switching circuit to receive the input voltage and the output voltage, wherein based on the input voltage and output voltage, the preprocessing circuit generates a first multiplication input signal. The first multiplier is coupled to the preprocessing circuit to receive the first multiplication input signal, wherein the first multiplier multiplies the first multiplication input signal by a second multiplication input signal and generates a first product signal. The first comparing circuit coupled to the current sensing circuit and the first multiplier to receive the current sensing signal and the first product signal, wherein the first comparing circuit compares the current sensing signal with the first product signal and generates a first comparison signal. The logic circuit is coupled to the first comparing circuit to receive the first comparison signal, wherein the logic circuit turns off the main switch when the current sensing signal is larger than the first product signal.

BRIEF DESCRIPTION OF THE DRAWINGS

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 3A:
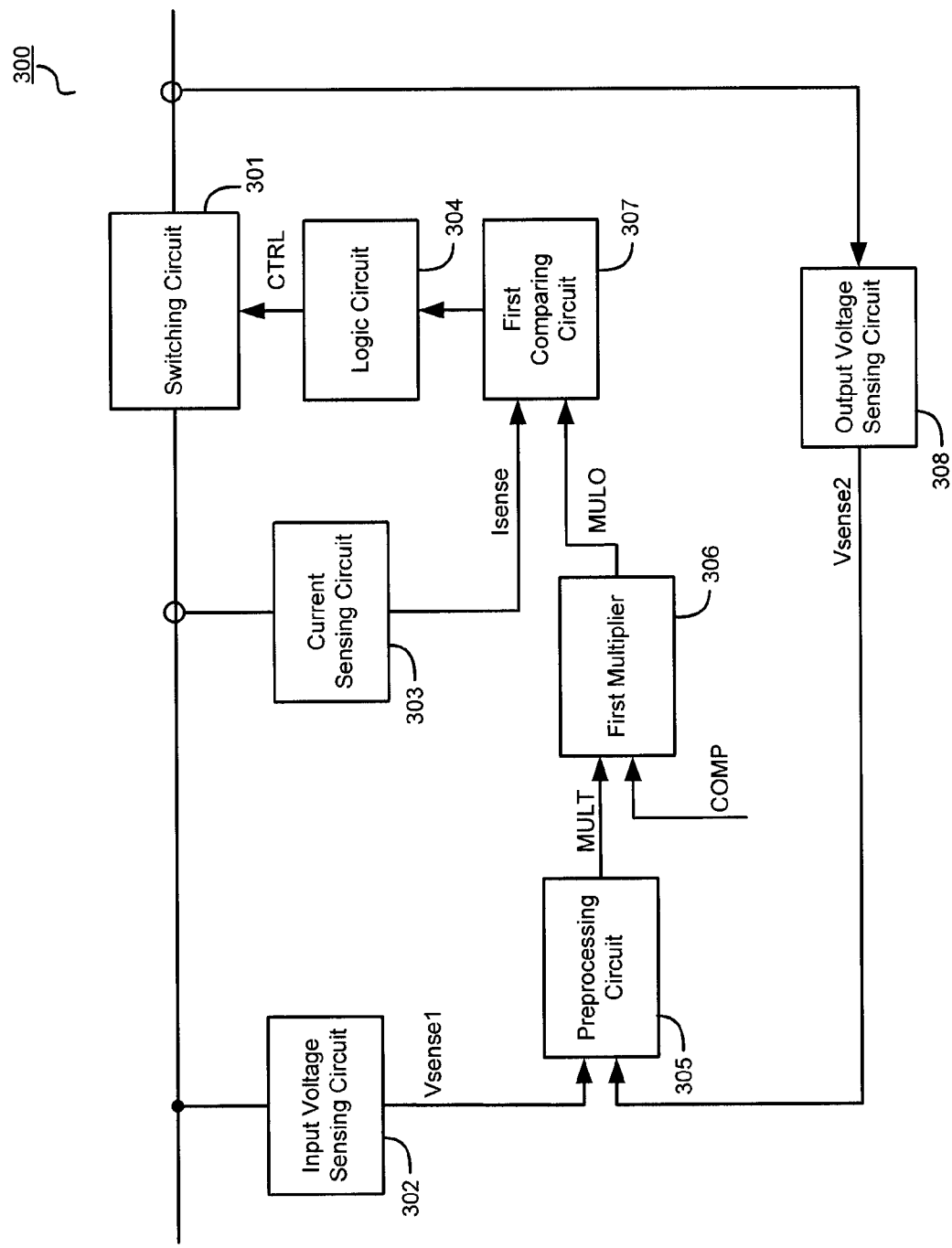
FIG. 3A is a block diagram of a switching power supply 300 in accordance with an embodiment of the present disclosure.

FIG. 3A is a block diagram of a switching power supply 300 in accordance with an embodiment of the present disclosure. The switching power supply 300 comprises a switching circuit 301, a current sensing circuit 303 and a control circuit. The switching circuit 301 comprises a main switch and a tank element coupled to the main switch. The switching circuit 301 receives AC power from the power network through a rectifier bridge (not shown). Energy is stored in the tank element when the main switch is ON, and transferred to the load when the main switch is OFF. The switching circuit 301 may be configured in Buck converter, Buck-Boost converter, Flyback converter and other suitable topologies. The main switch may be any controllable semiconductor device, such as MOSFET (metal oxide semiconductor field effect transistor), IGBT (isolated gate bipolar transistor) and so on. The current sensing circuit 303 is coupled to the input terminal of the switching circuit 301. It senses the input current Iin of the switching circuit 301 and generates a current sensing signal Isense.

The control circuit is coupled to the gate of the main switch, and generates a control signal CTRL to control the ON and OFF switching of the main switch. The control circuit comprises a preprocessing circuit 305, a first multiplier 306, a first comparing circuit 307 and a logic circuit 304. The preprocessing circuit 305 generates a first multiplication input signal MULT based on the input voltage Vin and the output voltage Vout of the switching circuit 301. The first multiplier 306 is coupled to the preprocessing circuit 305, and multiplies the first multiplication input signal MULT by a second multiplication input signal to generate a first product signal MULO. The first comparing circuit 307 is coupled to the current sensing circuit 303 and the first multiplier 306, and compares the current sensing signal Isense with the first product signal MULO. The logic circuit 304 is coupled to the first comparing circuit 307 and the gate of the main switch. The main switch is turned off by the logic circuit 304 when the current sensing signal Isense is larger than the first product signal MULO. In one embodiment, the second multiplication input signal is a compensation signal COMP related to any one of the output voltage, output current and output power of the switching circuit 301, or their combination.

The switching circuit 301 may work in a continuous current mode, a discontinuous current mode or a critical continuous current mode. In one embodiment, the switching circuit 301 works in the critical continuous current mode. The logic circuit 304 turns off the main switch when the current flowing through the tank element is substantially reduced to zero. The detection of the current zero crossing may be realized by monitoring the voltage across the main switch.

In critical continuous current mode, the average input current Iave of the input current Iin can be expressed as:

$$Iave = 0.5*Ton*Ipk/T = 0.5*D*Ipk \quad (1)$$

wherein T is the switching period, Ton is the on-time of the main switch during one switching period, D is the duty cycle of the main switch, Ipk is the peak input current. Since the logic circuit 304 turns off the main switch when the current sensing signal Isense is larger than the first product signal MULO, the peak value Ipk can be expressed as:

$$Ipk = MULO/m = MULT*COMP/m \quad (2)$$

wherein m is the sensing ratio of the current sensing circuit 303. In order to get the average input current Iave to follow the input voltage Vin, the average input current Iave should be proportional to the input voltage Vin, which can be expressed as:

$$Iave = 0.5*D*MULT*COMP/m = k*Vin \quad (3)$$

wherein k is a constant corresponding to the input impedance of the switching power supply. Since the compensation signal COMP is substantially constant in steady state, the first multiplication input signal MULT can be expressed as:

$$MULT = p*Vin/D \quad (4)$$

wherein p=2*k*m/COMP.

In Buck converter, the duty cycle D can be expressed as:

$$D = Vout/Vin \quad (5)$$

Combining Equation (4) with Equation (5), we can get:

$$MULT = p*Vin^2/Vout \quad (6)$$

Since a large capacitor is often coupled between the output terminals of the Buck converter, the output voltage Vout is substantially constant. The Equation (6) can be simplified as:

$$MULT = q*Vin^2 \quad (7)$$

wherein q=p/Vout=2*k*m/(COMP*Vout).

In Buck-Boost converter, the duty cycle D can be expressed as:

$$D = Vout/(Vin+Vout) \quad (8)$$

Combining Equation (4) with Equation (8), we can get:

$$MULT = p*(Vin+Vout)*Vin/Vout \quad (9)$$

Since a large capacitor is often coupled between the output terminals of the Buck-Boost converter, the output voltage Vout is substantially constant. The Equation (9) can be simplified as:

$$MULT = q*(Vin+Vout)*Vin \quad (10)$$

In Flyback converter, the duty cycle D can be expressed as:

$$D = Vout/(n*Vin+Vout) \quad (11)$$

Wherein n is the turn ratio of the transformer in the Flyback converter. Combining Equation (4) with Equation (11), we can get:

$$MULT = p*(n*Vin+Vout)*Vin/Vout \quad (12)$$

Since a large capacitor is often coupled between the output terminals of the Flyback converter, the output voltage Vout is substantially constant. The Equation (12) can be simplified as:

$$MULT = q*(n*Vin+Vout)*Vin \quad (13)$$

Persons with ordinary skill in the art can recognize that, the expression of the first multiplication input signal MULT in the continuous current mode and discontinuous current mode can be achieved similarly.

In the embodiments shown in FIG. 3, the first multiplication input signal MULT is generated based on the input voltage Vin and output voltage Vout of the switching circuit, so as to get the average input current Iave to follow the input voltage Vin. The average input current Iave is sinusoidal and in phase with the input voltage Vin. Thus the THD of the switching power supply is reduced and the power factor is improved.

In one embodiment, the switching power supply 300 further comprises an input voltage sensing circuit 302 and an output voltage sensing circuit 308. The input voltage sensing circuit 302 is coupled to the input terminal of the switching circuit 301. It senses the input voltage Vin of the switching circuit 301 and generates an input voltage sensing signal Vsense1. The output voltage sensing circuit 308 is coupled to the output terminal of the switching circuit 301. It senses the output voltage Vout of the switching circuit 301 and generates an output voltage sensing signal Vsense2. The preprocessing circuit 305 is coupled to the input voltage sensing circuit 302 and the output voltage sensing circuit 308, wherein based on the input voltage sensing signal Vsense1 and the output voltage sensing signal Vsense2, the preprocessing circuit 305 generates the first multiplication input signal MULT.

Figure 3B:
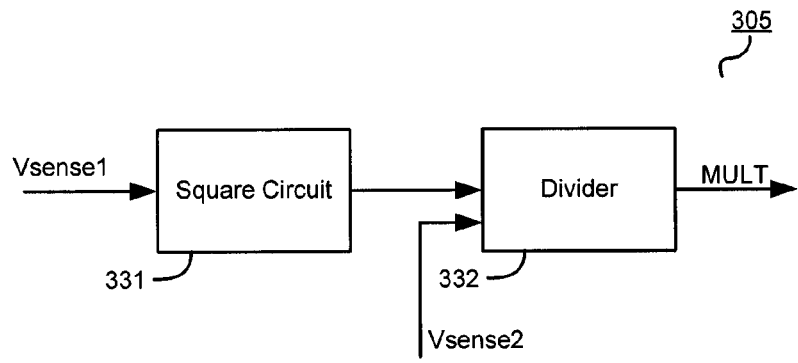
FIG. 3B is a block diagram of the preprocessing circuit 305 shown in FIG. 3A in accordance with an embodiment of the present disclosure.

FIG. 3B is a block diagram of the preprocessing circuit 305 shown in FIG. 3A in accordance with an embodiment of the present disclosure. The preprocessing circuit 305 comprises a square circuit 331 and a divider 332. The square circuit 331 is coupled to the input voltage sensing circuit 302 to receive the input voltage sensing signal Vsense1, and generates a square signal based on the input voltage sensing signal Vsense1. The divider 332 is coupled to the square circuit 331 and the output voltage sensing circuit 308, and divides the square signal by the output voltage sensing signal Vsense2 to get the first multiplication input signal MULT. In one embodiment, the divider 332 can be omitted and the square signal generated by the square circuit 331 is used as the first multiplication input signal MULT.

Figure 3C:
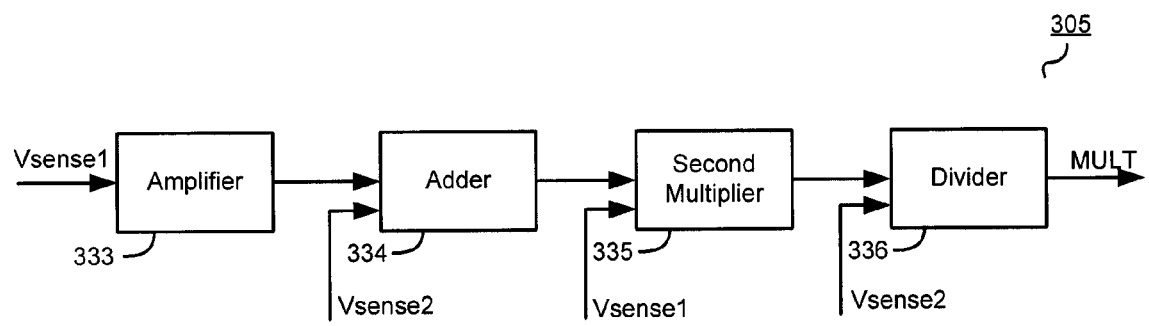
FIG. 3C is a block diagram of the preprocessing circuit 305 shown in FIG. 3A in accordance with another embodiment of the present disclosure.

FIG. 3C is a block diagram of the preprocessing circuit 305 shown in FIG. 3A in accordance with another embodiment of the present disclosure. The preprocessing circuit 305 comprises an amplifier 333, an adder 334, a second multiplier 335 and a divider 336. The amplifier 333 is coupled to the input voltage sensing circuit 302 to receive the input voltage sensing signal Vsense1, and multiplies the input voltage sensing signal Vsense1 by a constant to generate an amplified signal. The adder 334 is coupled to the amplifier 333 and the output voltage sensing circuit 308, and adds the amplified signal to the output voltage sensing signal Vsense2 to generate a sum signal. The second multiplier 335 is coupled to the adder 334 and the input voltage sensing circuit 302, and multiplies the sum signal by the input voltage sensing signal Vsense1 to generate a second product signal. The divider 336 is coupled to the second multiplier 335 and the output voltage sensing circuit 308, and divides the second product signal by the output voltage sensing signal Vsense2 to generate the first multiplication input signal MULT. In one embodiment, the divider 336 can be omitted and the second product signal generated by the second multiplier 335 is used as the first multiplication input signal MULT.

In the embodiments described above, the input voltage and output voltage of the switching circuit are sensed. The first multiplication input signal is generated based on the input voltage sensing signal and the output voltage sensing signal, so as to get the average input current of the switching circuit to follow up the input voltage. In these embodiments, additional output voltage sensing circuit is needed and very complex calculation needs to be conducted in the preprocessing circuit. In practice, curve fitting can be used. Simple electrical components, such as resistors, capacitors and zener diodes, can be used in the preprocessing circuit to generate the first multiplication input signal MULT based on the input voltage Vin of the switching circuit.

Figure 4:
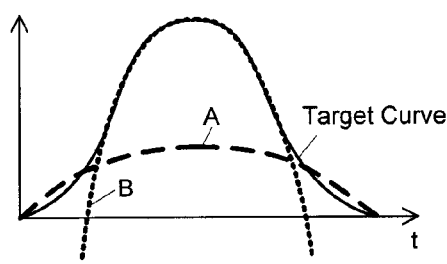
FIG. 4 is a curve diagram of a switching power supply in accordance with an embodiment of the present disclosure.

Buck-Boost converter with critical continuous current mode will be set as an example for detail explanation. FIG. 4 is a curve diagram of a switching power supply in accordance with an embodiment of the present disclosure. The function of the target curve is $q*(Vin+Vout)*Vin=q*(Vpk*|Sint|+Vout)*Vpk*|Sint|$, wherein Vpk is the peak value of the input voltage Vin. The function of the curve A is $a*|Sint|$, and the function of the curve B is $b*|int|-c$, wherein a, b, c are all constant. As shown in FIG. 4, the curves A and B have two points of intersection during a half of the switching period, wherein the value of the input voltage Vin corresponding to the two points is represented as V1. When the input voltage Vin is larger than V1 (between the two points), the curve B is used and the first multiplication input signal MULT is equal to the difference between a multiple of the input voltage Vin and a constant. When the input voltage Vin is smaller than V1 (outside the two points), the curve A is used and the first multiplication input signal MULT is proportional to the input voltage Vin. In this way, curve fitting is realized. The constants a, b and c may be determined by system simulation or circuit experiment based on THD minimization.

Although two curves are used in the embodiment shown in FIG. 4, persons skilled in the art can recognize, however, that more curves can be used for curve fitting. In one embodiment, a curve C besides the curves A and B is further used. The function of the curve C is $d|Sint|-e$, wherein d and e are both constant.

For Buck and Flyback converters with critical continuous current mode, the curves described above may also be used for curve fitting.

Figure 5:
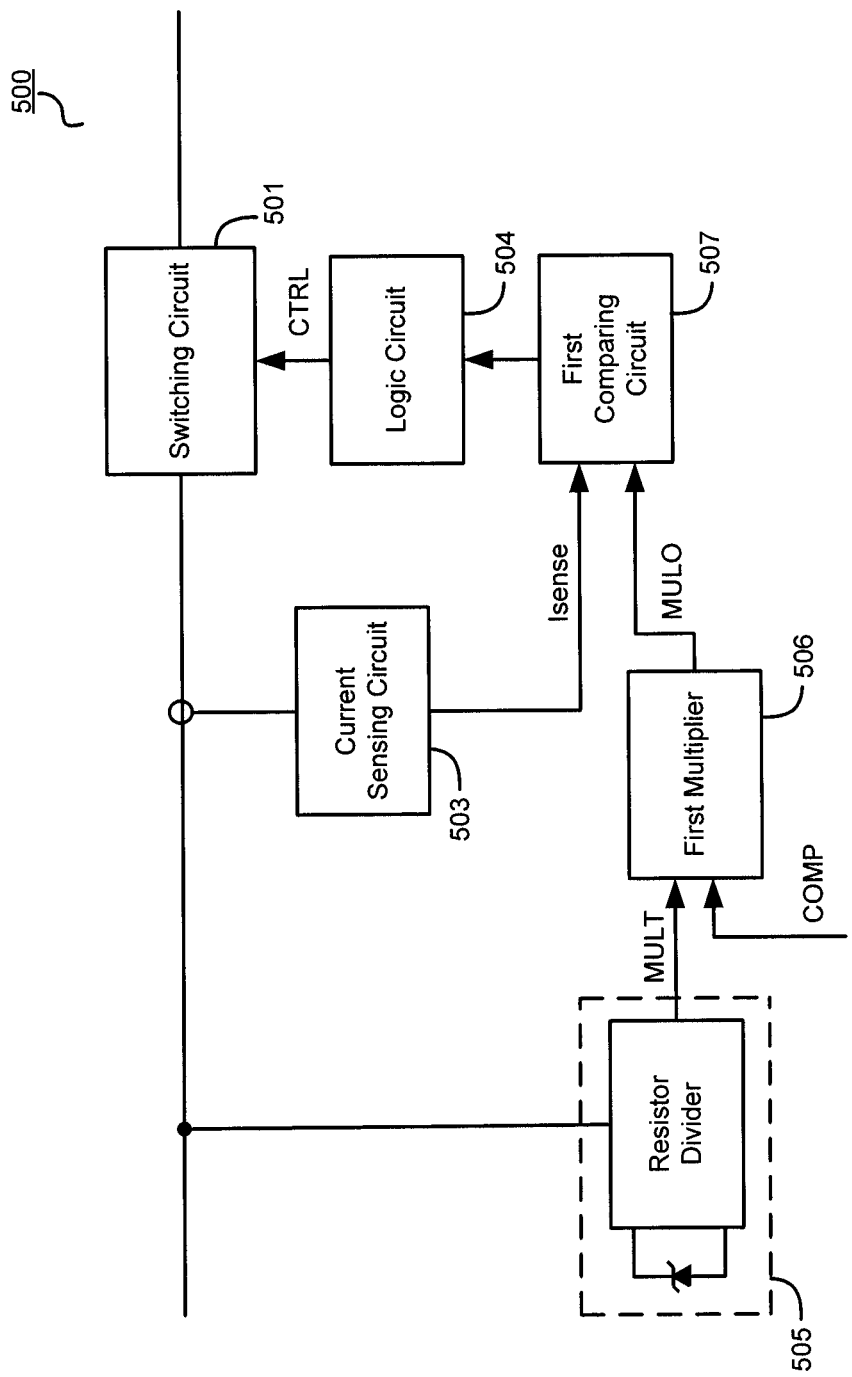
FIG. 5 is a block diagram of a switching power supply 500 in accordance with another embodiment of the present disclosure.

FIG. 5 is a block diagram of a switching power supply 500 in accordance with another embodiment of the present disclosure. The switching power supply 500 comprises a switching circuit 501, a current sensing circuit 503, a preprocessing circuit 505, a first multiplier 506, a first comparing circuit 507 and a logic circuit 504. The switching circuit 501, current sensing circuit 503, first multiplier 506, first comparing circuit 507 and the logic circuit 504 are substantially same with the corresponding circuits shown in FIG. 3.

The preprocessing circuit 505 is coupled to input terminal of the switching circuit 501 to receive the input voltage Vin and generates the first multiplication input signal MULT based on the input voltage Vin. The preprocessing circuit 505 comprises a resistor divider and at least one diode branch. The resistor divider comprises multiple resistors connected in serial and/or in parallel. The at least one diode branch comprises zener diodes, and is coupled to one or more resistors of the resistor divider in parallel. Since the zener diode is off when its reverse voltage is smaller than a breakdown voltage and has a substantially constant voltage when the reverse voltage is larger than the breakdown voltage, it can be used to realize the curve fitting.

Figure 6:
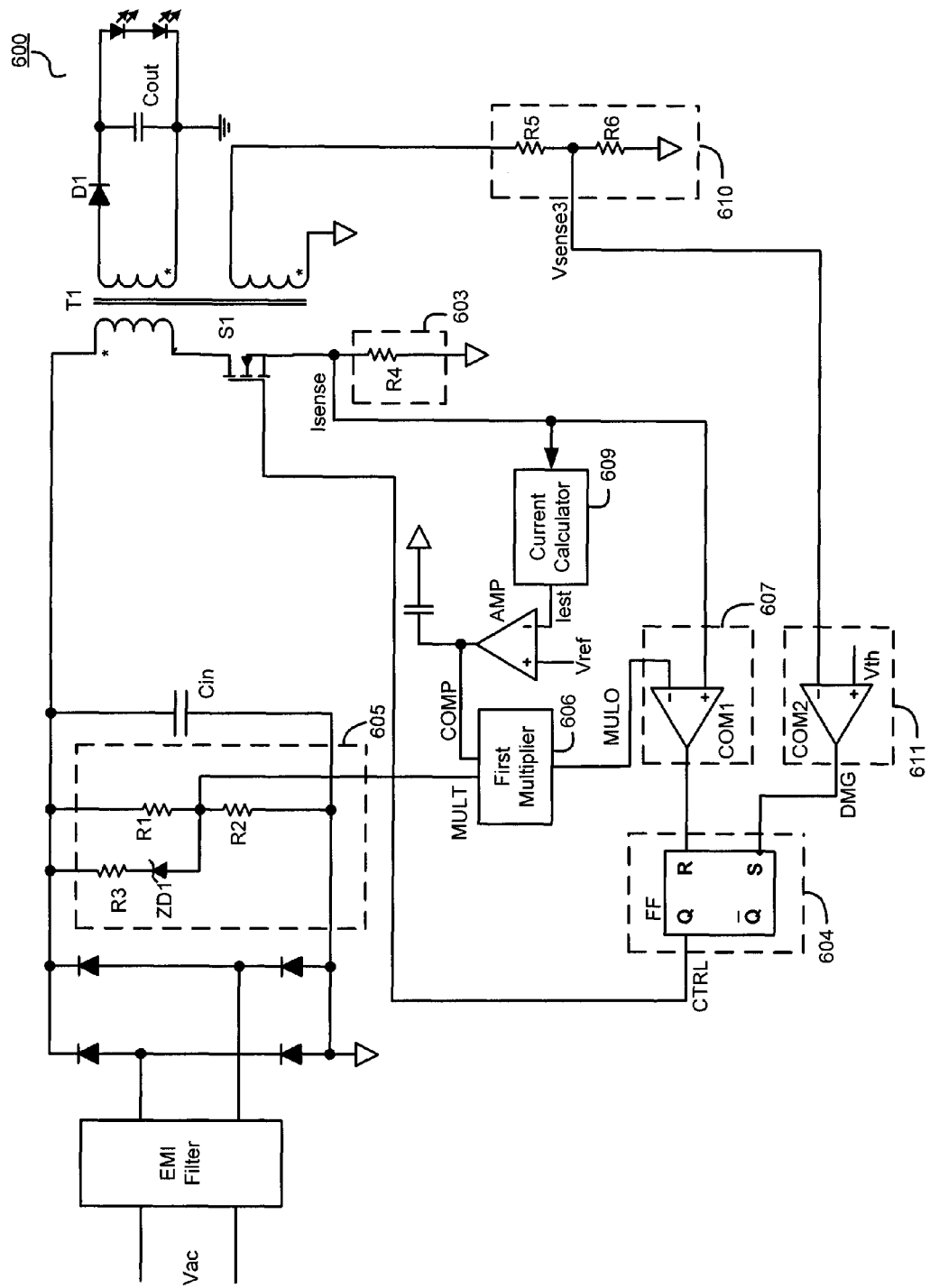
FIG. 6 schematically illustrates a switching power supply 600 in accordance with an embodiment of the present disclosure.

FIG. 6 schematically illustrates a switching power supply 600 in accordance with an embodiment of the present disclosure. The switching power supply 600 comprises an EMI filter, a rectifier bridge, a switching circuit, a current sensing circuit 603, a preprocessing circuit 605, a first multiplier 606, a first comparing circuit 607, a second comparing circuit 611 and a logic circuit 604. The switching circuit is a Flyback converter comprising an input capacitor Cin, a transformer T1, a main switch S1, a diode D1 and an output capacitor Cout.

The rectifier bridge receives an AC voltage Vac from the power network through the EMI filter, and converts the AC voltage Vac into an uncontrolled DC voltage. The input capacitor Cin is coupled to the output terminals of the rectifier bridge in parallel. The transformer T1 comprises a primary winding, a secondary winding and an auxiliary winding. The first terminal of the input capacitor Cin is coupled to the first terminal of the primary winding, the second terminal of the input capacitor Cin is grounded. The main switch S1 is a NMOS coupled between the second terminal of the primary winding and the ground. The anode of the diode D1 is coupled to the first terminal of the secondary winding, the cathode is coupled to the first terminal of the output capacitor Cout. The second terminal of the output capacitor Cout is coupled to the second terminal of the secondary winding. A LED string is coupled to the output capacitor Cout is parallel. In one embodiment, the diode D1 may be replaced by a synchronous switch.

The current sensing circuit 603 comprises a resistor R4 coupled between the source of the main switch S1 and the ground. It senses the current flowing through the main switch S1 and generates the current sensing signal Isense.

The preprocessing circuit 605 comprises a resistor divider and a diode branch. The resistor divider comprises resistors R1 and R2 connected in serial. The diode branch comprises a zener diode ZD1 and a resistor R3 connected in serial. The diode branch is coupled to the resistor R1 in parallel. The voltage across the resistor R2 is used as the first multiplication input signal MULT.

The resistor R1 has a first terminal and a second terminal, wherein the first terminal is coupled to the input terminal of the switching circuit. The resistor R2 has a first terminal and a second terminal, wherein the first terminal is coupled to the second terminal of the resistor R1, the second terminal is grounded. The cathode of the zener diode ZD1 is coupled to the first terminal of the resistor R1, the anode is coupled to the second terminal of the resistor R1. The resistor R3 is coupled to the zener diode ZD1 in serial. It may be coupled between the first terminal of the resistor R1 and the cathode of the zener diode ZD1, or coupled between the anode of the zener diode ZD1 and the second terminal of the resistor R1.

When the voltage across the resistor R1 is smaller than the breakdown voltage VBR1 of the zener diode ZD1, which means the input voltage Vin is smaller than VBR1*(R1+R2)/R1, the zener diode ZD1 is off and the first multiplication input signal MULT is equal to R2*Vin/(R1+R2). When the input voltage Vin is larger than VBR1*(R1+R2)/R1, the zener diode ZD1 is reverse broken down and the first multiplication input signal MULT is equal to (R2*R3*Vin+R1*R2*Vin−R1*R2*VZD1)/(R1*R2+R1*R3+R2*R3), wherein VZD1 is the steady voltage of the zener diode ZD1.

The first multiplier 606 is coupled to the preprocessing circuit 605, and multiplies the first multiplication input signal MULT by a second multiplication input signal to generate a first product signal MULO. In one embodiment, the switching power supply 600 further comprises a current calculator 609 and an error amplifier AMP. The current calculator 609 is coupled to the current sensing circuit 603 to receive the current sensing signal Isense, and generates a current estimation signal Iest representative of the current flowing through the LED string. The non-inverting input terminal of the error amplifier AMP receives a reference signal Vref, the inverting input terminal is coupled to the current calculator 609 to receive the current estimation signal Iest. A compensation signal COMP used as the second multiplication input signal is provided at the output terminal of the error amplifier AMP.

The first comparing circuit 607 is coupled to the current sensing circuit 603 and the first multiplier 606, and compares the current sensing signal Isense with the first product signal MULO. The switch voltage sensing circuit 610 is coupled to the auxiliary winding of the transformer T1. It senses the voltage across the auxiliary winding to generate a switch voltage sensing signal Vsense3 representative of the voltage across the main switch S1. The second comparing circuit 611 is coupled to the switch voltage sensing circuit 610, and compares the switch voltage sensing signal Vsense3 with a threshold voltage Vth. The logic circuit 604 is coupled to the first comparing circuit 607 and the second comparing circuit 611. It turns off the main switch S1 when the current sensing signal Isense is larger than the first product signal MULO, and turns on the main switch S1 when the switch voltage sensing signal Vsense3 is smaller than the threshold voltage Vth.

In one embodiment, the switch voltage sensing circuit 610 comprises a resistor divider consisted of resistors R5 and R6. The first comparing circuit 607 comprises a comparator COM1, wherein the non-inverting input terminal of the comparator COM1 is coupled to the current sensing circuit 603 to receive the current sensing signal (sense, the inverting input terminal is coupled to the first multiplier 606 to receive the first product signal MULO. The second comparing circuit 611 comprises a comparator COM2, wherein the non-inverting input terminal of the comparator COM2 is configured to receive the threshold voltage Vth, the inverting input terminal is coupled to the switch voltage sensing circuit 610 to receive the switch voltage sensing signal Vsense3. The logic circuit 604 comprises a RS flip-flop FF, wherein the reset terminal of the flip-flop FF is coupled to the output terminal of the comparator COM1, the set terminal is coupled to the output terminal of the comparator COM2. The output terminal of the flip-flop FF is coupled to the gate of the main switch S1 to provide the control signal CTRL.

When the main switch S1 is on, energy is stored in the transformer T1. The current sensing signal Isense as well as the current flowing through the main switch S1 is increased. The output signal DMG of the comparator COM2 is logical high since the switch voltage sensing signal Vsense3 is smaller than the threshold voltage Vth. When current sensing signal Isense is increased to be larger than the first product signal MULO, the output signal of the comparator COM1 becomes logical high. The flip-flop FF is reset and the main switch S1 is turned off.

When the main switch S1 is off, the current sensing signal Isense as well as the current flowing through the main switch S1 is zero, and the output signal of the comparator COM1 is logical low. The energy stored in the transformer T1 is transferred to the load (LED string). The output signal DMG of the comparator COM2 is logical low since the switch voltage sensing signal Vsense3 is larger than the threshold voltage Vth. After the energy stored in the transformer T1 being all transferred to the load, the magnetizing inductance of the transformer T1 begins to resonate with the parasitic capacitance of the main switch S1. When the switch voltage sensing signal Vsense3 is reduced to be smaller than the threshold voltage Vth, which means the voltage across the main switch S1 reaches its valley point, the output signal DMG of the comparator COM2 becomes logical high. The flip-flop FF is set and the main switch S1 is turned on.

Figure 1:
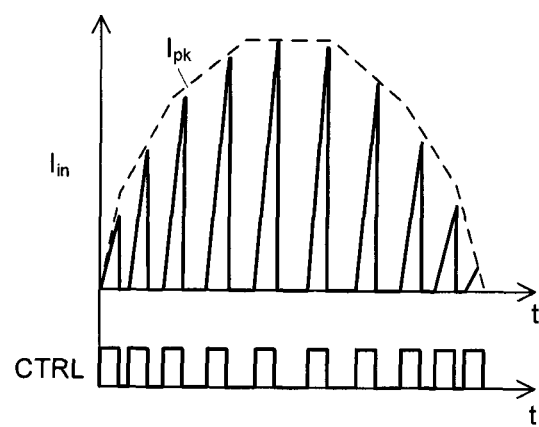
FIGS. 1 and 2 are waveforms of prior switching circuits with discontinuous input current.
Figure 2:
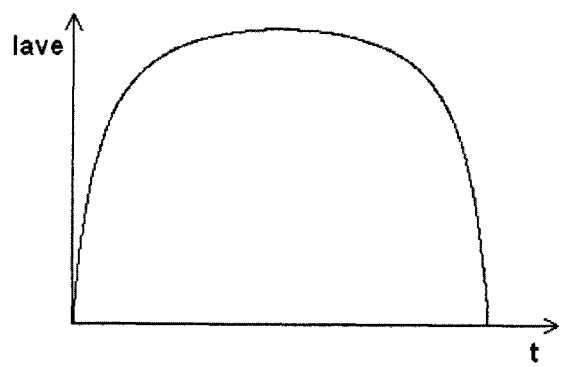

The preprocessing circuit 605 generates the first multiplication signal MULT based on the input voltage Vin. The first multiplication signal MULT is then used to regulate the peak input current Ipeak, so as to get the average input current Iave to follow the input voltage Vin. The THD of the switching power supply is reduced and the power factor is improved. In one embodiment, the effective value of the AC voltage Vac is 220V. For the prior switching power supply shown in FIG. 1, the THD is 23.1%. For the switching power supply show in FIG. 6, the THD is 11.8% if we choose VZD1=150V, R1=R3=1 MΩ, R2=5 KΩ.

In one embodiment, the zener diode ZD1 in the preprocessing circuit 605 is replaced by multiple serial connected zener diodes. So the breakdown voltage of the zener diode and also the cost can be reduced. In some embodiments, the preprocessing circuit 605 may comprise multiple diode branches coupled to the resistor R1 is parallel, wherein each diode branch comprises a zener diode and a resistor connected in serial. The breakdown voltage of the zener diodes in the multiple diode branches may be different, so as to realize the curve fitting based on multiple curves.

Figure 7:
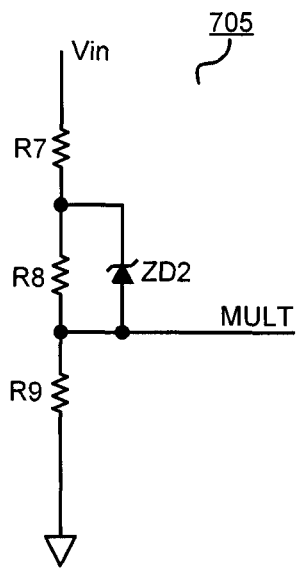
FIG. 7 schematically illustrates a preprocessing circuit 705 in accordance with an embodiment of the present disclosure.

FIG. 7 schematically illustrates a preprocessing circuit 705 in accordance with an embodiment of the present disclosure. The resistor divider comprises resistors R7~R9, and the diode branch comprises a zener diode ZD2. The first terminal of the resistor R7 is coupled to the input terminal of the switching circuit to receive the input voltage Vin, the second terminal is coupled to the first terminal of the resistor R8 and the cathode of the zener diode ZD2. The second terminal of the resistor R8 is coupled to the first terminal of the resistor R9 and the anode of the zener diode ZD2, the second terminal of the resistor R9 is grounded. The voltage across the resistor R9 is used as the first multiplication signal MULT.

When the voltage across the resistor R8 is smaller than the breakdown voltage VBR2 of the zener diode ZD2, which means the input voltage Vin is smaller than VBR2*(R7+R8+R9)/R8, the zener diode ZD2 is off and the first multiplication input signal MULT is equal to R9*Vin/(R7+R8+R9). When the input voltage Vin is larger than VBR2*(R7+R8+R9)/R8, the zener diode ZD2 is reverse broken down and the first multiplication input signal MULT is equal to R9*(Vin−VZD2)/(R7+R9), wherein VZD2 is the steady voltage of the zener diode ZD2.

Figure 8:
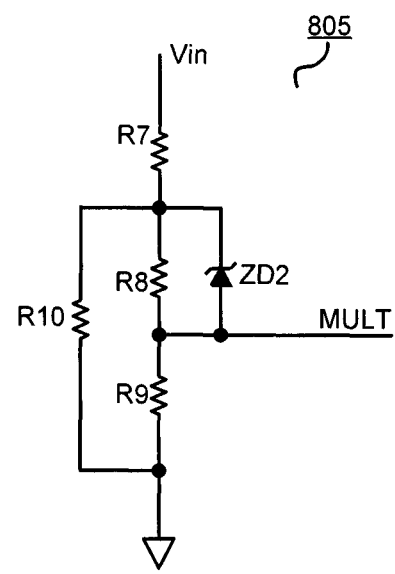
FIG. 8 schematically illustrates a preprocessing circuit 805 in accordance with another embodiment of the present disclosure.

FIG. 8 schematically illustrates a preprocessing circuit 805 in accordance with another embodiment of the present disclosure. Compared with the preprocessing circuit 705 shown in FIG. 7, the resistor divider in the preprocessing circuit 805 further comprises a resistor R10. The first terminal of the resistor R10 is coupled to the first terminal of the resistor R8, the second terminal of the resistor R10 is grounded. In the embodiment shown in FIG. 8, the breakdown voltage of the zener diode ZD2 is reduced so as to reduce the cost.

When the voltage across the resistor R8 is smaller than the breakdown voltage VBR2 of the zener diode ZD2, the first multiplication input signal MULT is equal to Vin/(R7*R8+R7*R9+R7*R10+R8*R10+R9*R10). When the voltage across the resistor R8 is larger than the breakdown voltage VBR2 of the zener diode ZD2, the zener diode ZD2 is reverse broken down. The first multiplication input signal MULT is equal to (Vin−R7*R9*VZD2−R9*R10*VZD2)/(R7*R10+R7*R9+R9*R10).

Figure 9:
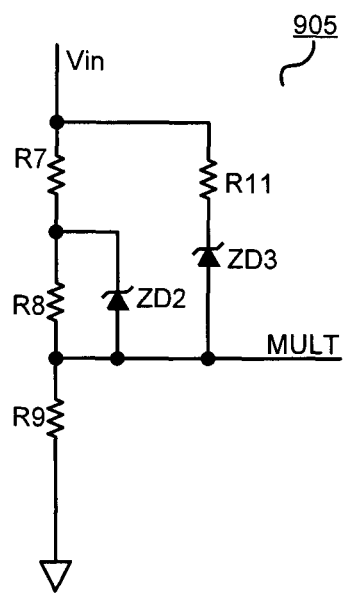
FIG. 9 schematically illustrates a preprocessing circuit 905 in accordance with still another embodiment of the present disclosure.

FIG. 9 schematically illustrates a preprocessing circuit 905 in accordance with still another embodiment of the present disclosure. Compared with the preprocessing circuit 705 shown in FIG. 7, the preprocessing circuit 805 further comprises a diode branch consisted of a resistor R11 and a zener diode ZD3. The first terminal of the resistor R11 is coupled to the first terminal of the resistor R7, the second terminal of the resistor R11 is coupled to the cathode of the zener diode ZD3. The anode of the zener diode ZD3 is coupled to the first terminal of the resistor R9.

Figure 10:
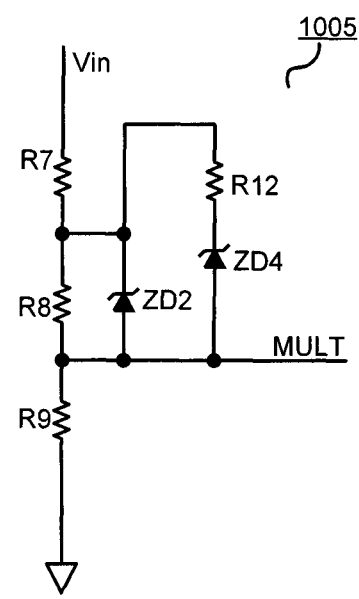
FIG. 10 schematically illustrates a preprocessing circuit 1005 in accordance with still another embodiment of the present disclosure.

FIG. 10 schematically illustrates a preprocessing circuit 1005 in accordance with still another embodiment of the present disclosure. Compared with the preprocessing circuit 705 shown in FIG. 7, the preprocessing circuit 1005 further comprises a diode branch consisted of a resistor R12 and a zener diode ZD4. The first terminal of the resistor R12 is coupled to the first terminal of the resistor R8, the second terminal of the resistor R12 is coupled to the cathode of the zener diode ZD4. The anode of the zener diode ZD4 is coupled to the first terminal of the resistor R9. In one embodiment, similar to the preprocessing circuit 805 shown in FIG. 8, the preprocessing circuit 1005 further comprises a resistor R10. The first terminal of the resistor R10 is coupled to the first terminal of the resistor R8, the second terminal of the resistor R10 is grounded.

Figure 11:
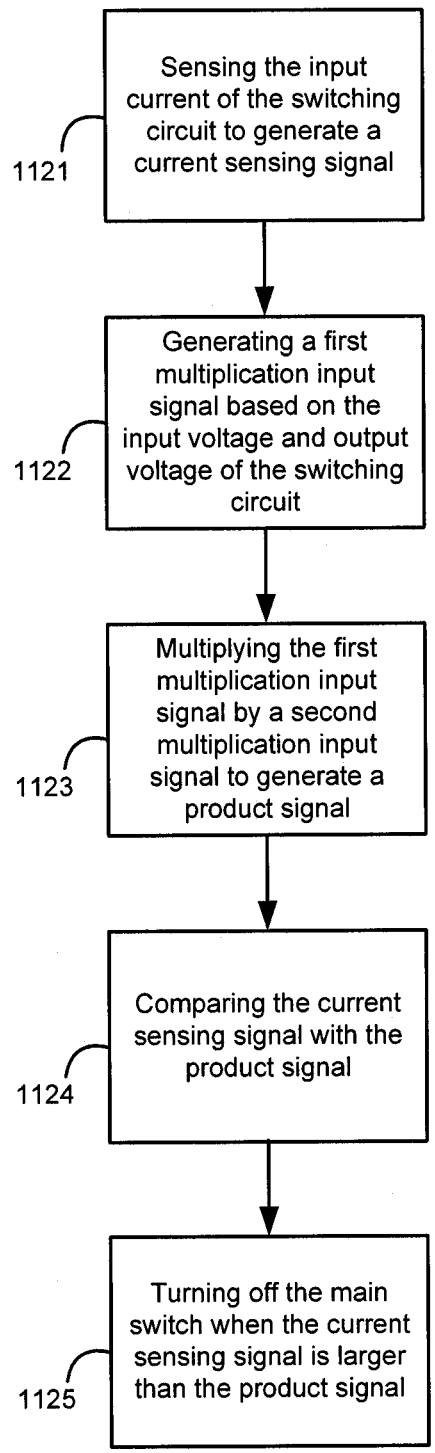
FIG. 11 is a flow chart of a control method used in a switching power supply, in accordance with an embodiment of the present disclosure.

FIG. 11 is a flow chart of a control method used in a switching power supply, in accordance with an embodiment of the present disclosure. The switching power supply comprises a switching circuit having a main switch and a tank element. The switching circuit converts an input voltage into an output voltage through the ON and OFF switching of the main switch. The control method comprises steps 1121~1125.

At step 1121, the input current of the switching circuit is sensed and a current sensing signal representative of the input current is generated.

At step 1122, a first multiplication input signal is generated based on the input voltage and the output voltage of the switching circuit.

At step 1123, the first multiplication input signal is multiplied by a second multiplication input signal to generate a first product signal. In one embodiment, the second multiplication input signal is a compensation signal COMP related to any one of the output voltage, output current and output power of the switching circuit 301, or their combination.

At step 1124, the current sensing signal is compared with the first product signal.

At step 1125, the main switch in the switching circuit is turned off when the current sensing signal is larger than the first product signal.

In one embodiment, the main switch is turned on when the current flowing through the tank element is substantially reduced to zero.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

We claim:

1. A switching power supply, comprising:
   a switching circuit having a main switch and a tank element, wherein the switching circuit converts an input voltage into an output voltage through the ON and OFF switching of the main switch;
   a current sensing circuit coupled to the switching circuit, wherein the current sensing circuit senses the input current of the switching circuit and generates a current sensing signal representative of the input current;
   a preprocessing circuit coupled to the switching circuit to receive the input voltage and the output voltage, wherein based on the input voltage and output voltage, the preprocessing circuit generates a first multiplication input signal;

a first multiplier coupled to the preprocessing circuit to receive the first multiplication input signal, wherein the first multiplier multiplies the first multiplication input signal by a second multiplication input signal and generates a first product signal, wherein the second multiplication input signal is a compensation signal related to the output voltage, the output current or the output power of the switching circuit;

a first comparing circuit coupled to the current sensing circuit and the first multiplier to receive the current sensing signal and the first product signal, wherein the first comparing circuit compares the current sensing signal with the first product signal and generates a first comparison signal; and a logic circuit coupled to the first comparing circuit to receive the first comparison signal, wherein the logic circuit turns off the main switch when the current sensing signal is larger than the first product signal.

2. The switching power supply of claim 1, further comprising:

an input voltage sensing circuit coupled to the switching circuit, wherein the input voltage sensing circuit senses the input voltage of the switching circuit and generates an input voltage sensing signal representative of the input voltage; and an output voltage sensing circuit coupled to the switching circuit, wherein the output voltage sensing circuit senses the output voltage of the switching circuit and generates an output voltage sensing signal representative of the output voltage; wherein the preprocessing circuit is coupled to the input voltage sensing circuit and the output voltage sensing circuit to receive the input voltage sensing signal and the output voltage sensing signal, and wherein based on the input voltage sensing signal and the output voltage sensing signal, the preprocessing circuit generates the first multiplication input signal.

3. The switching power supply of claim 2, wherein the preprocessing circuit comprises:

a square circuit having an input terminal and an output terminal, wherein the input terminal is coupled to the input voltage sensing circuit to receive the input voltage sensing signal, and wherein based on the input voltage sensing signal, the square circuit generates the first multiplication input signal at the output terminal.

4. The switching power supply of claim 2, wherein the preprocessing circuit comprises:

an amplifier having an input terminal and an output terminal, wherein the input terminal is coupled to the input voltage sensing circuit to receive the input voltage sensing signal, and wherein the amplifier multiply the input voltage sensing signal with a constant to generate an amplified signal at the output terminal;

an adder having a first input terminal, a second input terminal and an output terminal, wherein the first input terminal is coupled to the output terminal of the amplifier to receive the amplified signal, the second input terminal is coupled to the output voltage sensing circuit to receive the output voltage sensing signal, and wherein the adder adds the amplified signal to the output voltage sensing signal to generate a sum signal at the output terminal; and a second multiplier having a first input terminal, a second input terminal and an output terminal, wherein the first input terminal is coupled to the output terminal of the adder to receive the sum signal, the second input terminal is coupled to the input voltage sensing circuit to receive the input voltage sensing signal, and wherein the second multiplier multiplies the sum signal by the input voltage sensing signal to generate the first multiplication input signal at the output terminal.

5. The switching power supply of claim 1, wherein when the input voltage is larger than a predetermined value, the first multiplication input signal is equal to the difference between a multiple of the input voltage and a constant; when the input voltage is smaller than the predetermined value, the first multiplication input signal is proportional to the input voltage.

6. The switching power supply of claim 1, wherein the logic circuit turns on the main switch when the current flowing through the tank element is substantially reduced to zero.

7. A switching power supply, comprising:

a switching circuit having a main switch and a tank element, wherein the switching circuit converts an input voltage into an output voltage through the ON and OFF switching of the main switch;

a current sensing circuit coupled to the switching circuit, wherein the current sensing circuit senses the input current of the switching circuit and generates a current sensing signal representative of the input current;

a preprocessing circuit coupled to the switching circuit to receive the input voltage, wherein the preprocessing circuit generates a first multiplication input signal based on the input voltage to get the average input current of the switching circuit to follow the input voltage, the preprocessing circuit comprises a resistor divider having multiple resistors and at least one diode branch, and wherein the at least one diode branch is coupled to one or more resistors of the resistor divider in parallel;

a first multiplier coupled to the preprocessing circuit to receive the first multiplication input signal, wherein the first multiplier multiplies the first multiplication input signal by a second multiplication input signal and generates a first product signal;

a first comparing circuit coupled to the current sensing circuit and the first multiplier to receive the current sensing signal and the first product signal, wherein the first comparing circuit compares the current sensing signal with the first product signal and generates a first comparison signal; and a logic circuit coupled to the first comparing circuit to receive the first comparison signal, wherein the logic circuit turns off the main switch when the current sensing signal is larger than the first product signal.

8. The switching power supply of claim 7, wherein the resistor divider comprises a first resistor and a second resistor connected in serial, wherein the voltage across the second resistor is used as the first multiplication input signal; and wherein the at least one diode branch comprises a zener diode and a third resistor connected in serial, wherein the diode branch is coupled to the first resistor in parallel.

9. The switching power supply of claim 7, wherein the second multiplication input signal is a compensation signal related to the output voltage, the output current or the output power of the switching circuit.

10. The switching power supply of claim 7, wherein the logic circuit turns on the main switch when the current flowing through the tank element is substantially reduced to zero.

11. The switching power supply of claim 7, further comprising:

a switch voltage sensing circuit coupled to the main switch, wherein the switch voltage sensing circuit senses the voltage across the main switch and generates a switch voltage sensing signal; and a second comparing circuit coupled to the switch voltage sensing circuit to receive the switch voltage sensing signal, wherein the second comparing circuit compares the switch voltage sensing signal with a threshold voltage and generates a second comparison signal;

wherein the logic circuit is further coupled to the second comparing circuit to receive the second comparison signal, and wherein the logic circuit turns on the main switch when the switch voltage sensing signal is smaller than the threshold voltage.

12. A control method used in a switching power supply, wherein the switching power supply comprises a switching circuit having a main switch and a tank element, the switching circuit converts an input voltage into an output voltage through the ON and OFF switching of the main switch, the control method comprises:

sensing the input current of the switching circuit and generating a current sensing signal representative of the input current;

generating a first multiplication input signal based on the input voltage and the output voltage of the switching circuit;

multiplying the first multiplication input signal by a second multiplication input signal and generating a first product signal, wherein the second multiplication input signal is a compensation signal related to the output voltage, the output current or the output power of the switching circuit;

comparing the current sensing signal with the first product signal; and turning off the main switch when the current sensing signal is larger than the first product signal.

13. The control method of claim 12, the step of generating the first multiplication input signal comprises:

sensing the input voltage of the switching circuit and generating an input voltage sensing signal representative of the input voltage;

sensing the output voltage of the switching circuit and generating an output voltage sensing signal representative of the output voltage; and generating the first multiplication input signal based on the input voltage sensing signal and the output voltage sensing signal.

14. The control method of claim 13, wherein the first multiplication input signal is square of the input voltage sensing signal.

15. The control method of claim 13, wherein the step of generating the first multiplication input signal further comprises:

multiplying the input voltage sensing signal by a constant to generate an amplified signal;

adding the amplified signal to the output voltage sensing signal to generate a sum signal; and multiplying the sum signal with the input voltage sensing signal to generate the first multiplication input signal.

16. The control method of claim 12, wherein the main switch is turned on when the current flowing through the tank element is substantially reduced to zero.

17. The control method of claim 12, wherein when the input voltage is larger than a predetermined value, the first multiplication input signal is equal to the difference between a multiple of the input voltage and a constant; when the input voltage is smaller than the predetermined value, the first multiplication input signal is proportional to the input voltage.

* * * * *